United States Patent
Yamakawa et al.

(10) Patent No.: US 7,425,373 B2
(45) Date of Patent: Sep. 16, 2008

(54) PRIMER COMPOSITION

(75) Inventors: Naoki Yamakawa, Usui-gun (JP); Noriyuki Meguriya, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 155 days.

(21) Appl. No.: 11/120,985

(22) Filed: May 4, 2005

(65) Prior Publication Data

US 2005/0250902 A1    Nov. 10, 2005

(30) Foreign Application Priority Data

May 7, 2004    (JP) .............................. 2004-138250

(51) Int. Cl.
*B32B 9/04* (2006.01)

(52) U.S. Cl. ................. 428/447; 428/448; 428/450; 525/477; 528/34; 556/431; 556/432; 556/433; 556/445; 556/460; 556/461

(58) Field of Classification Search ............... None
See application file for complete search history.

(56) References Cited

U.S. PATENT DOCUMENTS

| 4,332,844 | A | | 6/1982 | Hamada et al. | |
|---|---|---|---|---|---|
| 5,366,805 | A | * | 11/1994 | Fujiki et al. | 428/412 |
| 5,879,809 | A | * | 3/1999 | Muramatsu et al. | 428/412 |
| 5,922,505 | A | * | 7/1999 | Sonokawa | 430/272.1 |
| 6,780,518 | B2 | * | 8/2004 | Azechi et al. | 428/451 |
| 2002/0132891 | A1 | * | 9/2002 | Azechi et al. | 524/261 |

FOREIGN PATENT DOCUMENTS

| JP | 52-32030 | 3/1977 |
|---|---|---|
| JP | 61-2107 | 1/1986 |
| JP | 10-121023 | 5/1998 |

* cited by examiner

*Primary Examiner*—Marc S Zimmer
(74) *Attorney, Agent, or Firm*—Oblon, Spivak, McClelland, Maier & Neustadt, P.C.

(57) ABSTRACT

A primer composition comprising a compound containing an epoxy group, a Si—H group, and an aromatic ring per molecule, and a solvent is effective for assisting in integral molding or bonding a silicone rubber to an adherend of gold, silver or platinum.

18 Claims, No Drawings

PRIMER COMPOSITION

CROSS-REFERENCE TO RELATED APPLICATION

This non-provisional application claims priority under 35 U.S.C. §119(a) on Patent Application No. 2004-138250 filed in Japan on May 7, 2004, the entire contents of which are hereby incorporated by reference.

TECHNICAL FIELD

This invention relates to a primer composition capable of establishing a firm bond between silicone rubber and an adherend, and more particularly, to a primer composition capable of establishing a firm bond between silicone rubber and a metal, typically a noble metal which is believed difficult to bond to the silicone rubber, such as gold, silver or platinum.

BACKGROUND ART

Owing to excellent heat resistance and other properties of silicone rubber, integrally molded parts of silicone rubber and metal have been used in a wide variety of applications including automotive parts such as gaskets, household parts such as fan frame seals, electric appliance parts such as water heater gaskets, and copier or printer parts such as fixing unit-related parts. In response to the currently growing application of silicone rubber to electric and electronic fields, there is a need for a primer capable of bonding silicone rubber having durable fatigue properties to members of gold, silver or the like typically used as electric contacts.

Heretofore, a number of primer compositions have been proposed as applicable to the adherends to which silicone rubber is to be attached. For example, JP-A 52-32030 describes a composition comprising a tetraorganotitanate, an epoxy group-containing alkoxysilane, an aliphatic unsaturation-bearing organosilicon compound, a platinum compound, a solvent-soluble polymer, and an organic solvent. JP-B 61-2107 corresponding to U.S. Pat. No. 4,332,844 describes a composition comprising an alkoxy group-containing organosilicon compound, an organotitanium compound, and a hydrosilyl group-containing organosilicon compound. JP-A 10-121023 discloses a primer composition comprising an organooxy group-containing organosilane compound and/or partial hydrolytic condensate thereof; a hydrosilyl group-containing organosilicon compound and/or an organosilicon compound having at least one hydrosilyl group and having 1 to 4 di- or trivalent, optionally substituted, aromatic rings per molecule or having an alkylene group of 2 to 30 carbon atoms; and an organoaluminum compound.

On use of these primer compositions, they firmly adhere to various plastics and ordinary metals such as iron and aluminum, but not to substrates having an inert surface such as silver and gold.

SUMMARY OF THE INVENTION

An object of the present invention is to provide a primer composition capable of establishing a firm bond between silicone rubber and metals, and bonding to gold and silver in particular.

The inventor has found that a compound containing at least one each of epoxy group, Si—H group, and aromatic ring per molecule is effective for helping bond silicone rubber to a metal. In particularly, by adding a compound containing at least one each of epoxy group, Si—H group, and aromatic ring per molecule to a solvent, and further adding a silicone resin, silane coupling agent, condensation catalyst and the like thereto, there is obtained a primer composition which helps bond silicone rubber not only to those substrates of iron, aluminum or the like which are easy to bond, but also to those substrates having an inert surface of silver, gold, platinum or the like which are difficult to bond. Additionally, the composition forms a bond having good resistance to steam.

Accordingly, the present invention provides a primer composition for assisting in integral molding of a silicone rubber and an adherend, comprising a compound containing at least one epoxy group, at least one Si—H group, and at least one aromatic ring per molecule, and a solvent.

The primer composition of the invention helps bond silicone rubber effectively to those metal substrates which are otherwise difficult to bond, such as silver, gold and platinum. The bond thus established is firm and durable or resistant to steam. The primer composition may be effectively utilized in wide areas of application including electric and electronic parts.

DESCRIPTION OF THE PREFERRED EMBODIMENTS

The primer composition of the present invention comprises a compound containing at least one epoxy group, at least one Si—H group, and at least one aromatic ring per molecule, and a solvent. The composition may further comprise at least one member selected from among a silicone resin, an organooxy group-containing organosilane compound and a partial hydrolytic condensate thereof.

One preferred embodiment is a primer composition comprising (A) 10 parts by weight of a compound containing at least one epoxy group, at least one Si—H group, and at least one aromatic ring per molecule, (B) 1 to 100 parts by weight of a silicone resin, (C) 1 to 100 parts by weight of an organooxy group-containing organosilane compound of the average compositional formula (1):

$$R^1_a R^2_b (OR^3)_c SiO_{(4-a-b-c)/2} \qquad (1)$$

wherein $R^1$ is a substituted or unsubstituted, monovalent hydrocarbon group, $R^2$ is a monovalent organic group having an epoxy, (meth)acrylic, amino or mercapto functional group, $R^3$ is a substituted or unsubstituted, monovalent hydrocarbon group, a, b and c are numbers satisfying $0 \leq a \leq 3$, $0 \leq b \leq 3$, $0 < c \leq 4$, and $0 < a+b+c \leq 4$, and/or a partial hydrolytic condensate thereof, (D) 0 to 100 parts by weight of a condensation catalyst, and (E) a solvent.

Now components (A) to (E) are described in detail.

Component (A) is a compound containing at least one epoxy group, at least one Si—H group, and at least one aromatic ring per molecule, which is essential to impart adhesion. It may also referred to as a tackifier component.

The compound should contain per molecule at least one, preferably 1 to 20 aromatic rings, which are typically benzene, naphthalene or anthracene rings having a valence of 1 to 4, desirably 1 or 2. The inclusion of an aromatic ring(s) within the molecule contributes to an improved bond at the interface between silicone rubber and substrates or adherends.

The compound should also contain at least one epoxy group such as glycidoxy per molecule. The epoxy group such as glycidoxy is necessary to develop adhesion, while the compound should have an epoxy equivalent in a range of 100 to 5,000 g/mol, preferably in a range of 100 to 2,000 g/mol, and more preferably in a range of 120 to 1,000 g/mol. A compound with an epoxy equivalent of less than 100 is difficult to synthesize whereas an epoxy equivalent of more than 5,000 leads to insufficient adhesion.

Additionally, the compound should contain at least one Si—H group, i.e., silicon-bonded hydrogen atom, per molecule. The number of Si—H groups per compound molecule is at least one, typically 1 to about 100, preferably 1 to about 50, and most preferably about 2 to about 20.

Suitable compounds (A) are organosilicon compounds having 1 to 500, preferably 1 to 200, and more preferably 1 to 50 silicon atoms, including organosilanes and organopolysiloxanes of linear or cyclic structure.

In a particular embodiment, preferred compounds (A) are organosilicon compounds each having an epoxy equivalent of 100 to 5,000 g/mol, more preferably 100 to 1,000 g/mol, having at least one phenyl structure (i.e., di- to tetravalent phenylene group) or phenyl group in a molecule, and containing at least one, typically 1 to about 10, more typically about 2 to about 6 Si—H groups in a molecule.

In a preferred embodiment, the primer composition of the invention uses as component (A) an organic compound, specifically an organosilicon compound such as organosilane or organosiloxane, which has an epoxy group at an epoxy equivalent of 100 to 5,000 g/mol, has at least one benzene ring (as typified by a phenyl structure, i.e., di- to tetravalent phenylene group or a phenyl group), naphthalene ring, or anthracene ring, as the aromatic ring in a molecule, and contains at least one Si—H group; and in a more preferred embodiment, an organosilicon compound which has an epoxy group at an epoxy equivalent of 100 to 5,000 g/mol, has at least one benzene ring such as phenyl structure or phenyl group in a molecule, and contains at least one Si—H group. Reference is now made to the bonding silicone rubber composition of JP-A 6-172738 and the silicone adhesive composition of JP-A 8-53661, both owned by Shin-Etsu Chemical Co., Ltd. The tackifier components used therein have a benzene ring such as phenyl structure or phenyl group in a molecule, but are free of an epoxy group, and they adhere insufficiently to thermoplastic resins such as poly(methyl methacrylate), poly(phenylene sulfide), polyamides, and polyphthalamides. Besides, compositions comprising tackifier components having Si—H groups and epoxy groups are known. These tackifier components do not contain a benzene ring such as phenyl structure or phenyl group in a molecule, and they fail to provide sufficient adhesion to the aforementioned thermoplastic resins.

Illustrative examples of the compound (A) used herein are given below.

Note that X is

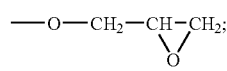

and Y is a group of the following formula:

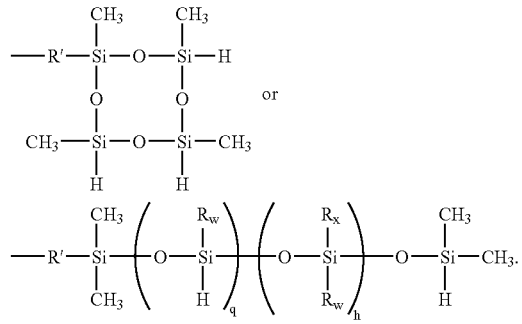

R' is a group selected from the following:

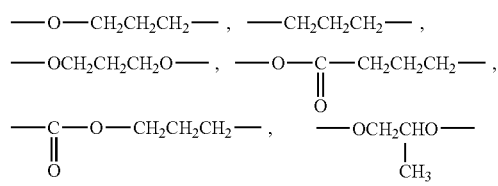

wherein Rw and Rx are substituted or unsubstituted, monovalent hydrocarbon groups, the letter q is 1 to 50, and h is 0 to 100; preferably q=1 to 20 and h=1 to 50.

R" is a group selected from the following:

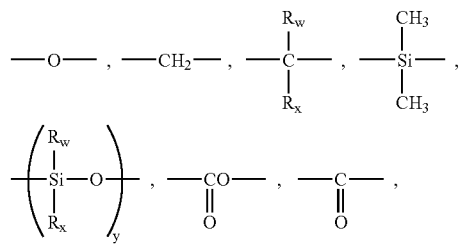

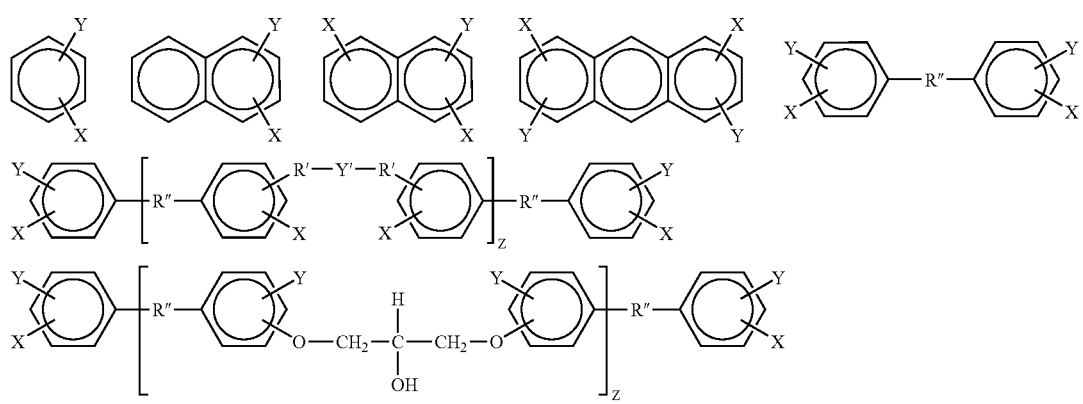

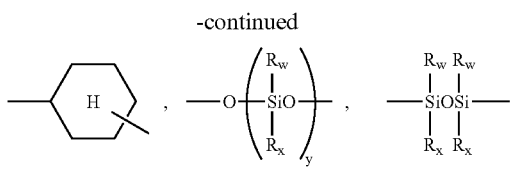 , 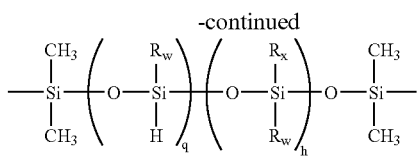

wherein Rw and Rx are as defined above, and y=0 to 100.

Y' is a group of the following formula:

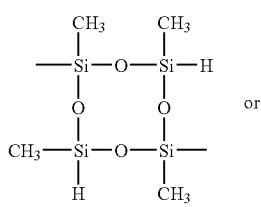

wherein Rw, Rx, q and h are as defined above. The letter z is a number of 1 to 10.

The substituted or unsubstituted, monovalent hydrocarbon groups represented by Rw and Rx are preferably those of 1 to 12 carbon atoms, more preferably 1 to 8 carbon atoms, including alkyl, aryl, aralkyl, and alkenyl groups, and those set forth above for $R^1$. Additionally, the substituted monovalent hydrocarbon groups include those in which one or more of hydrogen atoms of the unsubstituted monovalent hydrocarbon group are substituted with alkoxy, acrylic, methacrylic, acryloyl, methacryloyl, amino, alkylamino groups or the like.

As the tackifier component (A), the above-described compounds may be used alone or in admixture of two or more. A reaction product of such a compound is also useful.

Specific examples of suitable compound (A) are given below.

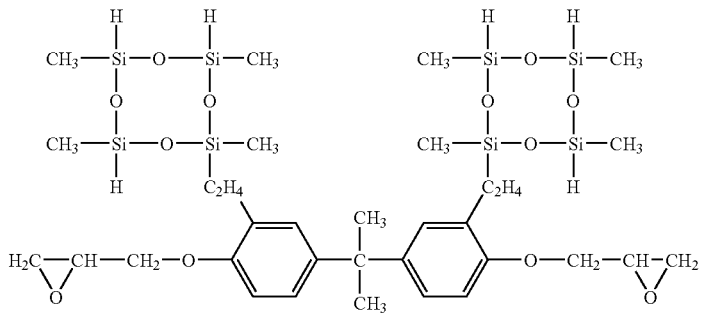

epoxy equivalent = 446 g/mol

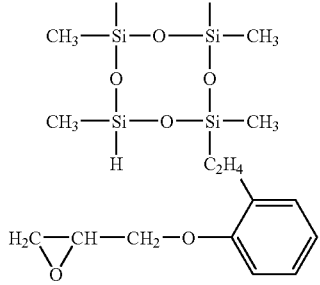

epoxy equivalent = 430 g/mol

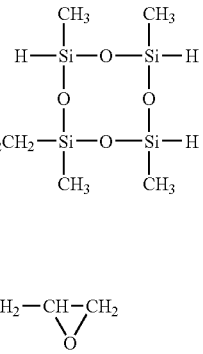

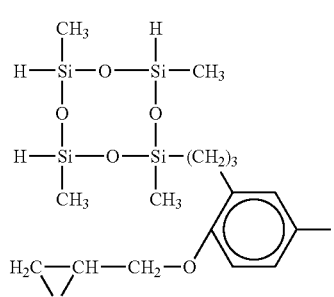

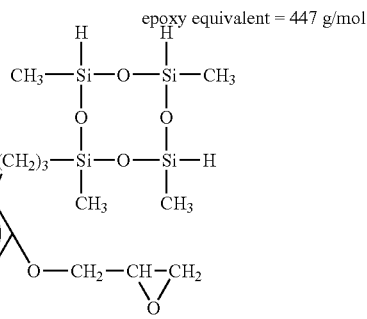

epoxy equivalent = 447 g/mol epoxy equivalent = 451 g/mol

In the primer composition of the invention, a solvent is included as component (E). The type and amount of the solvent are selected in accordance with working conditions and other parameters of the composition. Any desired solvent may be used as long as the other components of the composition are dissolvable therein. Typical solvents are organic solvents, for example, xylene, toluene, benzene, heptane, hexane, trichloroethylene, perchloroethylene, methylene chloride, ethyl acetate, methyl isobutyl ketone, methyl ethyl ketone, ethanol, isopropanol, butanol, ligroin, cyclohexanone, diethyl ether, rubber solvents, and silicone solvents. These solvents may be used alone or in admixture of two or more depending on the desired evaporation rate during application of the primer composition.

The solvent may be used in any desired amount as long as it does not interfere with the coating and drying steps. Typically the amount of the solvent used is 1 to 1,000 parts by weight, preferably 10 to 500 parts by weight per 10 parts by weight of component (A).

In a preferred embodiment, the primer composition of the invention may include a silicone resin (B). The silicone resin is an organopolysiloxane of three-dimensional network structure comprising trifunctional siloxane units and/or $SiO_{4/2}$ units in a molecule and helps the primer surface form a film. Included are silicone resins terminated with methyl groups, Si—H groups, aliphatic unsaturated groups and the like and silicone resins containing not only methyl groups, but also phenyl groups in a molecule, with phenyl-containing silicone resins being preferred for high affinity to component (A). Suitable phenyl-containing silicone resins include those resulting from hydrolysis of a mixture of trichlorosilane, diphenyldichlorosilane and dichlorosilane.

Suitable silicone resins used herein include silicone resins represented by the following average compositional formula (1-1), with those containing phenyl groups being preferred.

  (1-1)

Herein R is hydrogen, an alkyl group of 1 to 6 carbon atoms such as methyl, ethyl or propyl, or an alkenyl group of 2 to 4 carbon atoms such as vinyl or allyl; p and q are numbers satisfying $0.8 \leq p+q < 2$, preferably $1 \leq p+q \leq 1.8$, more preferably $1 \leq p+q \leq 1.5$, and $0 \leq q/(p+q) \leq 0.9$, preferably $0.1 \leq q/(p+q) \leq 0.80$, more preferably $0.25 \leq q/(p+q) \leq 0.70$.

In the silicone resin, the content of trifunctional siloxane units ($RSiO_{3/2}$ or $(C_6H_5)SiO_{3/2}$ units) and/or $SiO_{4/2}$ units is desirably 25 to 100 mol %, more desirably 30 to 70 mol % based on the entire siloxane units.

An appropriate amount of the silicone resin used is 1 to 100 parts by weight, more preferably 2 to 10 parts by weight per 10 parts by weight of component (A). Too less amounts of the silicone resin may sometimes fail to form an effective bonding film whereas too large amounts may sometimes lead to too low concentrations of the tackifier component, failing to provide satisfactory bonding.

In the primer composition of the invention, an organooxy group-containing organosilane compound and/or a partial hydrolytic condensate thereof may be compounded as component (C) for assisting in the action of component (A), thus improving adhesion to metals. It is sometimes referred to as silane coupling agent. The preferred component (C) is an organooxy group-containing organosilane compound of the average compositional formula (1):

  (1)

wherein $R^1$ is a substituted or unsubstituted, monovalent hydrocarbon group, $R^2$ is a monovalent organic group having an epoxy, (meth)acrylic, amino or mercapto functional group, $R^3$ is a substituted or unsubstituted, monovalent hydrocarbon group, a, b and c are numbers satisfying $0 \leq a \leq 3$, $0 \leq b \leq 3$, $0 < c \leq 4$, and $0 < a+b+c \leq 4$, and/or a partial hydrolytic condensate thereof (i.e., organopolysiloxane containing at least one, preferably two or more residual organooxy groups in a molecule).

In formula (1), $R^1$ stands for substituted or unsubstituted, monovalent hydrocarbon groups, preferably having 1 to 10 carbon atoms, more preferably 1 to 8 carbon atoms, for example, alkyl groups such as methyl, ethyl, propyl, isopropyl, butyl, isobutyl, tert-butyl, pentyl, neopentyl, hexyl, 2-ethylhexyl, heptyl, octyl, nonyl, decyl, and dodecyl; cycloalkyl groups such as cyclopentyl, cyclohexyl, and cycloheptyl; alkenyl groups such as vinyl, allyl, propenyl, isopropenyl, butenyl, isobutenyl, hexenyl, and cyclohexenyl; aryl groups such as phenyl, tolyl, xylyl, biphenyl, and naphthyl; aralkyl groups such as benzyl, phenylethyl, phenylpropyl and methylbenzyl; and substituted forms of the foregoing hydrocarbon groups in which some or all of the hydrogen atoms are replaced by halogen atoms (e.g., fluoro, chloro or bromo), cyano groups or the like, typically haloalkyl groups and cyano-substituted alkyl groups such as chloromethyl, 2-bromoethyl, 3,3,3-trifluoropropyl, 3-chloropropyl and cyanoethyl.

$R^2$ stands for monovalent organic groups having an epoxy, (meth)acrylic, amino or mercapto functional group, for example, epoxy-substituted alkyl groups represented by the formula:

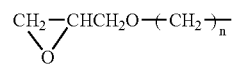

wherein n is an integer of 1 to 8, such as glycidoxypropyl; (meth)acrylic-substituted alkyl groups represented by the formula:

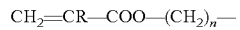

wherein R is hydrogen or methyl and n is an integer of 1 to 8, such as (meth)acryloxypropyl; amino-substituted alkyl groups represented by the formula:

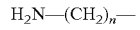

wherein n is an integer of 1 to 8, such as aminopropyl; and mercapto-substituted alkyl groups represented by the formula:

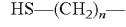

wherein n is an integer of 1 to 8, such as mercaptopropyl. $R^2$ may be such an organic group or a mixture of two or more. In the practice of the invention, the inclusion of at least one epoxy group is preferred.

$R^3$ stands for substituted or unsubstituted, monovalent hydrocarbon groups, preferably having 1 to 6 carbon atoms, more preferably 1 to 4 carbon atoms, examples of which are as exemplified above for $R^1$.

The letters a, b and c are numbers satisfying $0 \leq a \leq 3$, $0 \leq b \leq 3$, $0 < c \leq 4$, and $0 < a+b+c \leq 4$, and preferably $1 \leq a \leq 3$, $1 \leq b \leq 3$, $1 \leq c \leq 3$, and $1 \leq a+b+c \leq 4$.

Preferred as component (C) are organosilicon compounds having alkoxysilyl groups such as trimethoxysilyl, triethoxysilyl, and methyldimethoxysilyl, acrylic groups, ester groups, carboxylic anhydride groups, amino groups, and amide groups, with those having at least one epoxy group in a molecule being especially preferred. Such preferred compounds include tetramethoxysilane, tetraethoxysilane, methyltrimethoxysilane, phenyltrimethoxysilane, vinyltrimethoxysilane, γ-(meth)acryloxypropyltrimethoxysilane, γ-aminopropyltrimethoxysilane, γ-glycidoxypropyltrimethoxysilane, γ-glycidoxypropylmethyldiethoxysilane, and β-(3,4-epoxycyclohexyl)ethyltrimethoxysilane, as well as partial hydrolytic condensates thereof.

An appropriate amount of the organosilane compound or partial hydrolytic condensate thereof used is 1 to 100 parts by weight, more preferably 1 to 50 parts by weight per 10 parts by weight of component (A). Too less amounts of the silane coupling agent may sometimes fail to provide satisfactory bonding whereas too large amounts may sometimes lead to a drop of film strength and make the composition expensive.

To the primer composition of the invention, a condensation catalyst (E) may be added. Suitable condensation catalysts include amine base compounds, tin base compounds and titanium base compounds, with the titanium base condensation catalysts being more effective. Examples of organotitanium compounds include tetraisopropyl titanate, tetra-n-butyl titanate, butyl titanate dimer, tetra(2-ethylhexyl)titanate, diethoxytitanium acetylacetonate, titanium diacetylacetonate, titanium octylglycote, titanium lactate, titanium lactate ethyl ester, titanium triethanolaminate, and partial hydrolytic condensates thereof such as titanate esters, partially alkoxylated chelate compounds of titanium, titanium chelate compounds, silicate esters of titanium and chelates thereof.

An appropriate amount of the condensation catalyst used is 0 to 100 parts by weight, more preferably 1 to 10 parts by weight per 10 parts by weight of component (A). With too less amounts of the condensation catalyst, a long time of air drying may be necessary for condensation reaction of the primer component to proceed to a certain extent after the primer application. With too large amounts, the composition may solidify immediately after the application due to rapid condensation reaction, compromising the working efficiency.

The primer composition of the invention is readily obtainable by intimately mixing the foregoing components at room temperature. In the primer composition of the invention, any appropriate additives other than the foregoing may be compounded as long as they do not compromise the benefits of the invention.

When the primer composition of the invention is used for bonding, it is thinly applied to a surface of a substrate to be bonded or adherend which has been cleaned, by suitable coating means such as brush coating. The primer composition may be coated in a sufficient amount to form a primer thin film on the adherend surface. A typical primer buildup is 0.1 to 10 μm, preferably 0.5 to 5 μm. Too much a buildup may rather inhibit bonding between the adherend and silicone rubber. Once applied, the primer coating is preferably dried in air for about 30 minutes or more before silicone rubber is joined thereto. Also preferably, the primer coating is baked by heating at 120 to 150° C. for about 30 minutes to about 1 hour, if desired for ensuring bonding of the primer composition to the adherend or curing of the primer composition itself, before silicone rubber is joined thereto. For further enhancing the bond of the primer composition to the adherend, heat curing and bonding of silicone rubber is desirably followed by curing at 150° C. for at least 1 hour, preferably about 2 hours.

Examples of the substrate to be bonded or adherend include gold, silver, platinum, and metals such as steel, stainless steel, copper, aluminum, chromium, nickel and chromium-plated steel. Also included are metals (such as steel) and plastics which have been surface treated as by plating so that the surface is metallized or covered with gold, silver, platinum or a metal material containing at least one of the foregoing.

The silicone rubber used herein may be any of well-known silicone rubbers. Suitable silicone rubbers are obtainable from, for example, silicone rubber compositions of heat curing type comprising a diorganopolysiloxane gum and a filler as main components, which are cured with organic peroxides; and silicone rubber compositions of addition curing type comprising a vinyl-containing diorganopolysiloxane gum or oil, an organohydrogenpolysiloxane, and a filler as main components, which are heat cured in the presence of platinum catalysts, with the silicone rubber compositions of addition curing type being especially preferred.

EXAMPLE

Examples and Comparative Examples are given below for illustrating the present invention, but not for limiting the scope of the invention.

Examples 1-7

Primer compositions were prepared by combining the components shown in Table 1 and agitating them at room temperature until uniform.

Comparative Example 1

A primer composition was prepared as in Example 3 except that the adhesion promoter was omitted, that is, only the solvent, carbon functional silane coupling agent and condensation catalyst were used.

Comparative Example 2

A primer composition was prepared as in Example 1 except that a compound having epoxy and phenyl groups in its structure was used as the adhesion promoter.

There were furnished substrates of 25 mm wide×50 mm long×0.2 mm thick made of gold-plated steel and silver. Each primer composition was applied to the substrate surface over an area of 25 mm×10 mm and dried in air for 30 minutes. The coated substrate was then placed in a drier at 150° C. for oven-curing for 30 minutes. Onto the primer cured film, an addition cure type silicone rubber composition (KE1950-50A/B, blend ratio 100/100, by Shin-Etsu Chemical Co., Ltd.) was applied, press cured under curing conditions of 120° C. and 10 minutes, and further oven cured at 150° C. for 2 hours.

The bond test on the metal-silicone rubber assembly sample was a 180° peel test in which the rubber and the substrate were pulled in opposite directions. The sample was rated "○" for 100% rubber failure; "Δ○" for a mixture of rubber failure and interfacial peeling (less than 20%); "Δ" for a mixture of rubber failure and interfacial peeling (20% to less than 100%); and "X" for 100% interfacial peeling. The metal-silicone rubber assembly was evaluated for peel strength at the initial and also after holding at 120° C. and 100% RH for 70 hours, the latter being reported as steam resistance. The results are shown in Table 1.

TABLE 1

| Formulation (pbw) | Example | | | | | | | Comparative Example | |
|---|---|---|---|---|---|---|---|---|---|
| | 1 | 2 | 3 | 4 | 5 | 6 | 7 | 1 | 2 |
| Solvent | 100 | 100 | 100 | 100 | 100 | 100 | 100 | 100 | 100 |
| Adhesion promoter 1 | 10 | | 10 | 10 | 10 | 10 | | | |
| Adhesion promoter 2 | | 10 | | | | | | | |
| Adhesion promoter 3 | | | | | | | | | 10 |
| Phenyl-containing resin | 5 | 5 | | | 5 | 5 | 5 | | 5 |
| Methyl-containing resin | | | | 5 | | | | | |
| CF silane | 5 | 5 | 5 | 5 | | 5 | 5 | 5 | 5 |
| Condensation catalyst | 1 | 1 | 1 | 1 | 1 | | 1 | 1 | 1 |
| Tests | | | | | | | | | |
| Adhesion  Ag | ○ | ○ | Δ | Δ | Δ | Δ○ | Δ○ | X | X | X |
| Au | ○ | ○ | Δ | Δ | Δ | Δ○ | X | X | X |
| Steam resistance  Ag | ○ | ○ | — | — | — | — | — | — | — |
| Au | ○ | ○ | — | — | — | — | — | — | — |

Solvent: ethyl acetate
Adhesion promoter 1:

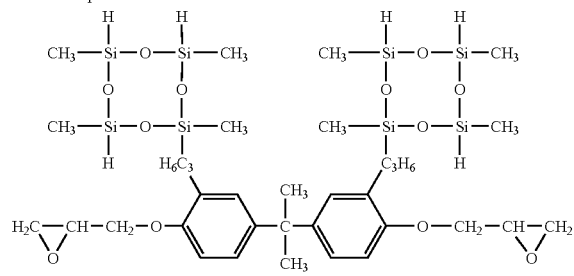

epoxy equivalent = 451 g/mol

Adhesion promoter 2:

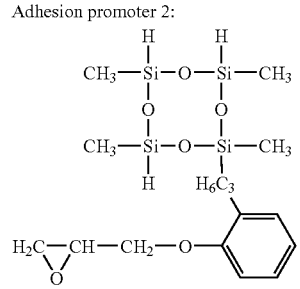

epoxy equivalent = 430 g/mol

Adhesion promoter 3:

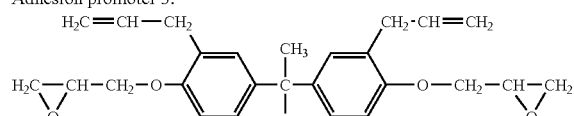

epoxy equivalent = 210 g/mol

Phenyl-containing resin:
a copolymer consisting of $C_6H_5SiO_{3/2}$ units, $CH_3SiO_{3/2}$ units, and $(CH_3)_2SiO_{2/2}$ units in which phenyl content relative to the total content of phenyl and methyl: 30 mol %;
OH content:
2.5 wt %; ratio of the total of $C_6H_5SiO_{3/2}$ and $CH_3SiO_{3/2}$ units to the entire siloxane units: 40 mol %)
Methyl-containing resin:
a copolymer consisting of $(CH_3)_3SiO_{1/2}$ units, $(CH_2\{CH\}(CH_3)_2SiO_{1/2}$ units, and $SiO_{4/2}$ units in which $[(CH_3)_3SiO_{1/2}$ units + $(CH_2\{CH\}(CH_3)_2SiO_{1/2}$ units]/$[SiO_{4/2}$ units] = 0.8 mol/mol; vinyl content: 0.0005 mol/g)
CF silane:
γ-glycidoxypropyltrimethoxysilane
(trade name KBM-403 by Shin-Etsu Chemical Co., Ltd.) Condensation catalyst: titanium tetraoctoate As seen from Table 1, the primer compositions within the scope of the invention are improved in adhesion and durable adhesion (or steam resistance), help silicone rubber adhere to gold and silver substrates, and remain effective during service under rigorous environmental conditions.

Japanese Patent Application No. 2004-138250 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A primer composition for assisting in integral molding of a silicone rubber and an adherend, comprising
   (A) 10 parts by weight of a compound comprising at least one epoxy group, at least one Si—H group, and at least one aromatic ring per molecule,
   (B) 1 to 100 parts by weight of a silicone resin,
   (C) 1 to 100 parts by weight of an organooxy group-comprising organosilane compound of the average compositional formula (1):

$$R^1_a R^2_b (OR^3)_c SiO_{(4-a-b-c)/2} \quad (1)$$

wherein $R^1$ is a substituted or unsubstituted, monovalent hydrocarbon group, $R^2$ is a monovalent organic group having an epoxy, (meth)acrylic, amino or mercapto functional group, $R^3$ is a substituted or unsubstituted, monovalent hydrocarbon group, a, b and c are numbers satisfying $0 \leq a \leq 3$, $0 \leq b \leq 3$, $0 < c \leq 4$, and $0 < a+b+c \leq 4$, and/or a partial hydrolytic condensate thereof,
   (D) 0 to 100 parts by weight of a condensation catalyst, and
   (E) a solvent.

2. An article comprising a silicone rubber, the primer composition of claim 1, and an adherend, wherein the silicone rubber results from curing of an addition cure silicone rubber composition.

3. A primer composition for assisting in integral molding of a silicone rubber and an adherend, comprising a compound comprising at least one epoxy group, at least one Si—H group, and at least one aromatic group per molecule, an organoxy group-comprising organosilane compound of the average compositional formula (1):

$$R^1_a R^2_b (OR^3)_c SiO_{(4-a-b-c)/2} \quad (1)$$

wherein $R^1$ is a substituted or unsubstituted monovalent hydrocarbon group, $R^2$ is a monovalent organic group having an epoxy, (meth)acrylic, amino or mercapto functional group, $R^3$ is a substituted or unsubstituted, monovalent hydrocarbon group, a, b and c are numbers satisfying $0 \leq a \leq 3$, $0 \leq b \leq 3$, $0 < c \leq 4$, and $0 < a+b+c \leq 4$, and or a partial hydrolytic condensate thereof, and a solvent.

4. The primer composition of claim 3, which further comprises a silicone resin.

5. The primer composition of claim 1 or 3, wherein the compound comprising at least one epoxy group, at least one Si—H group, and at least on aromatic ring per molecule is selected from the group of compounds represented by the following formulae:

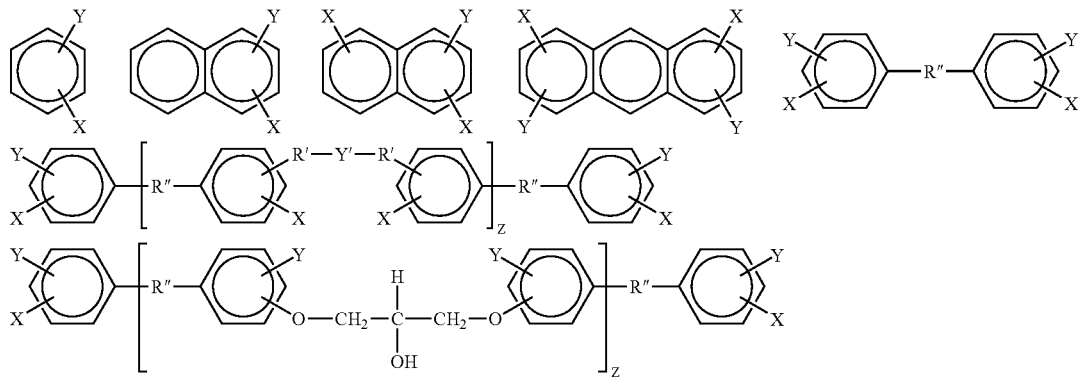

wherein X is

and Y is a group of the following formula:

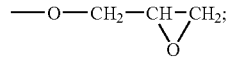

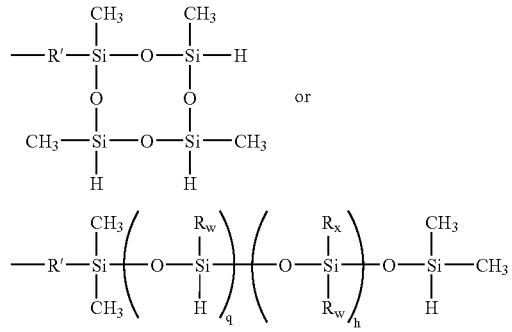

R' is a group selected from the following:

R':

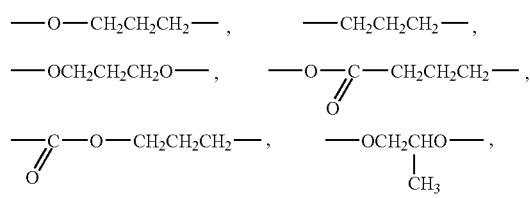

R" is a group selected from the following:

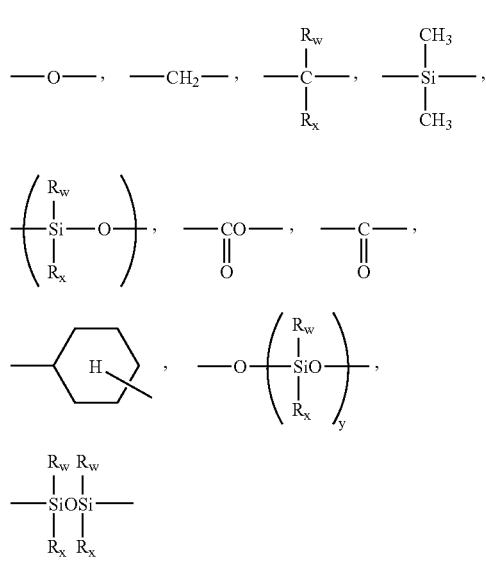

wherein Y' is a group of the following formula:

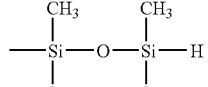

wherein $R_w$ and $R_x$ are substituted- or unsubstituted monovalent hydrocarbon groups, q=1 to 50, h=0 to 100, y=0 to 100, and the letter z is a number of 1 to 10.

6. The primer composition of claim 5, wherein the compound comprising at least one epoxy group, at least one Si—H group, and at least one aromatic ring per molecule is at least one selected from the group of compounds represented by the following formulae:

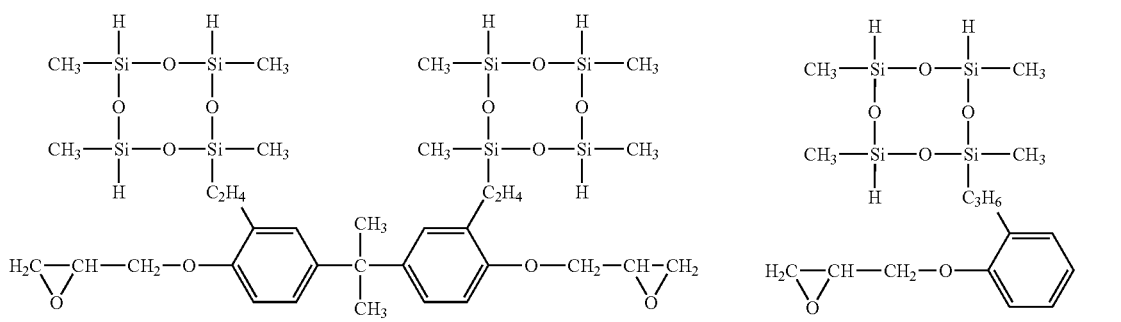

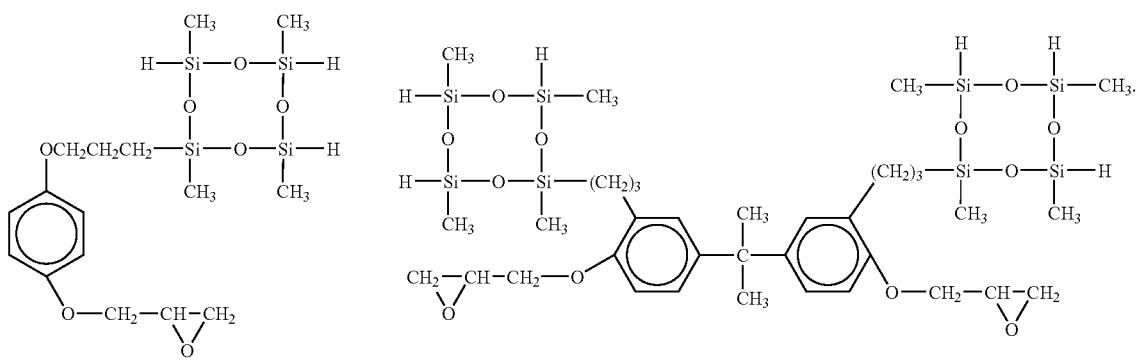

7. The primer composition of claim 1 or 4, wherein the silicone resin is an organopolysiloxane of three-dimensional network structure comprising trifunctional siloxane units and/or $SiO_{4/2}$ units in a molecule.

8. The primer composition of claim 7, wherein the silicone resin has the following average compositional formula (1-1):

$$R_p(C_6H_5)_qSiO_{(4-p-q)/2} \tag{1-1}$$

wherein R is hydrogen, an alkyl group of 1 to 6 carbon atoms, or an alkenyl group of 2 to 4 carbon atoms, and p and q are numbers satisfying $0.8 \leq p+q < 2$ and $0 \leq q/(p+q) \leq 0.9$.

9. The primer composition of claim 8, wherein in formula (1-1), $0.1 \leq q/(p+q) \leq 0.80$.

10. The primer composition of claim 3, wherein the solvent (E) is at least one selected from the group consisting of xylene, toluene, benzene, heptane, hexane, trichloroethylene, perchloroethylene, methylene chloride, ethyl acetate, methyl isobutyl ketone, methyl ethyl ketone, ethanol, isopropanol, butanol, ligroin, cyclohexanone, diethyl ether, rubbers solvents, and silicone solvents.

11. The primer composition of claim 1, wherein the solvent (E) is at least one selected from the group consisting of xylene, toluene, benzene, heptane, hexane, trichloroethylene, perchloroethylene, methylene chloride, ethyl acetate, methyl isobutyl ketone, methyl ethyl ketone, ethanol, isopropanol, butanol, ligroin, cyclohexanone, diethyl ether, rubbers solvents, and silicone solvents.

12. An article comprising a silicone rubber, the primer composition of claim 3, and an adherend, wherein the silicone rubber results from curing of an addition cure silicone rubber composition.

13. The primer composition of claim 1, wherein the adherend is made of a metal or has a surface metallized with gold, silver, platinum or a metal comprising at least one of the foregoing.

14. The primer composition of claim 3, wherein the adherend is made of a metal or has a surface metallized with gold, silver, platinum or a metal comprising at least one of the foregoing.

15. An article comprising a silicone rubber, a primer cured film, and an adherend, wherein the adherend is made of a metal, and wherein the primer cured film is formed by curing a primer composition comprising (A) 10 parts by weight of a compound comprising at least one epoxy group, at least one Si—H group, and at least one aromatic ring per molecule, (B) 1 to 100 parts by weight of a silicone resin, (C) 1 to 100 parts by weight of an organooxy group-comprising organosilane compound of the average compositional formula (1):

$$R^1{}_aR^2{}_b(OR^3)_cSiO_{(4-a-b-c)/2} \tag{1}$$

wherein $R^1$ is a substituted or unsubstituted, monovalent hydrocarbon group, $R^2$ is a monovalent organic group having an epoxy, (meth)acrylic, amino or mercapto functional group, $R^3$ is a substituted or unsubstituted, monovalent hydrocarbon group, a, b and c are numbers satisfying $0 \leq a \leq 3$, $0 \leq b \leq 3$, $0 < c \leq 4$, and $0 < a+b+c \leq 4$, and/or a partial hydrolytic condensate thereof, (D) 0 to 100 parts by weight of a condensation catalyst, and (E) a solvent.

16. An article comprising a silicone rubber, a primer cured film, and an adherend, wherein the adherend has a surface metallized with gold, silver, platinum or a metal comprising at least one of the foregoing, and wherein the primer cured film is formed by curing a primer composition comprising (A) 10 parts by weight of a compound comprising at least one epoxy group, at least one Si—H group, and at least one aromatic ring per molecule, (B) 1 to 100 parts by weight of a silicone resin, (C) 1 to 100 parts by weight of an organooxy group-comprising organosilane compound of the average compositional formula (1):

$$R^1{}_aR^2{}_b(OR^3)_cSiO_{(4-a-b-c)/2} \tag{1}$$

wherein $R^1$ is a substituted or unsubstituted, monovalent hydrocarbon group, $R^2$ is a monovalent organic group having an epoxy, (meth)acrylic, amino or mercapto functional group, $R^3$ is a substituted or unsubstituted, monovalent hydrocarbon group, a, b and c are numbers satisfying $0 \leq a \leq 3$, $0 \leq b \leq 3$, $0 < c \leq 4$, and $0 < a+b+c \leq 4$, and/or a partial hydrolytic condensate thereof, (D) 0 to 100 parts by weight of a condensation catalyst, and (E) a solvent.

17. An article comprising a silicone rubber, a primer cured film, and an adherend, wherein the adherend is made of a metal, and wherein the primer cured film is formed by curing a primer composition comprising at least one epoxy group, at least one Si—H group, and at least one aromatic group per molecule, an organoxy group-comprising organosilane compound of the average compositional formula (1):

$$R^1{}_aR^2{}_b(OR^3)_cSiO_{(4-a-b-c)/2} \tag{1}$$

wherein $R^1$ is a substituted or unsubstituted, monovalent hydrocarbon group, $R^2$ is a monovalent organic group having an epoxy, (meth)acrylic, amino or mercapto functional group, $R^3$ is a substituted or unsubstituted, monovalent hydrocarbon group, a, b and c are numbers satisfying $0 \leq a \leq 3$, $0 \leq b \leq 3$, $0 < c \leq 4$, and $0 < a+b+c \leq 4$, and/or a partial hydrolytic condensate thereof, and a solvent.

18. An article comprising a silicone rubber, a primer cured film, and an adherend, wherein the adherend has a surface metallized with gold, silver, platinum or a metal comprising at least one of the foregoing, and wherein the primer cured film is formed by curing a primer composition comprising at least one epoxy group, at least one Si—H group, and at least one aromatic group per molecule, an organoxy group-comprising organosilane compound of the average compositional formula (1):

$$R^1{}_aR^2{}_b(OR^3)_cSiO_{(4-a-b-c)/2} \tag{1}$$

wherein $R^1$ is a substituted or unsubstituted, monovalent hydrocarbon group, $R^2$ is a monovalent organic group having an epoxy, (meth)acrylic, amino or mercapto functional group, $R^3$ is a substituted or unsubstituted, monovalent hydrocarbon group, a, b and c are numbers satisfying $0 \leq a \leq 3$, $0 \leq b \leq 3$, $0 < c \leq 4$, and $0 < a+b+c \leq 4$, and/or a partial hydrolytic condensate thereof, and a solvent.

* * * * *